United States Patent
Shih et al.

(10) Patent No.: US 7,728,282 B2
(45) Date of Patent: Jun. 1, 2010

(54) METHOD AND APPARATUS CAPABLE OF CONTROLLING HEAT DISSIPATION BASED ON TEMPERATURES MEASURED AT AN INTAKE VENT AND AN OUTLET VENT

(75) Inventors: Fu-Shiung Shih, Tai-Chung Hsien (TW); Tzu-Huan Hsu, Taipei County (TW)

(73) Assignee: Qiada Corporation, Taoyuan County (TW)

( * ) Notice: Subject to any disclaimer, the term of this patent is extended or adjusted under 35 U.S.C. 154(b) by 572 days.

(21) Appl. No.: 11/750,333

(22) Filed: May 18, 2007

(65) Prior Publication Data
US 2007/0268462 A1      Nov. 22, 2007

(30) Foreign Application Priority Data
May 18, 2006    (TW)    .............................. 95117651 A

(51) Int. Cl.
*H01J 40/14*    (2006.01)

(52) U.S. Cl. ...................... 250/238; 250/239
(58) Field of Classification Search ................. 250/238, 250/214 R, 221, 239; 353/55–61, 119; 345/60, 345/905
See application file for complete search history.

(56) References Cited

U.S. PATENT DOCUMENTS

| | | | |
|---|---|---|---|
| 6,322,218 B1 | 11/2001 | Sugawara | |
| 6,554,432 B2 | 4/2003 | Ohfune | |
| 6,582,082 B2 * | 6/2003 | Tiao et al. | ..................... 353/57 |
| 6,873,929 B2 | 3/2005 | Lai | |
| 2002/0163626 A1 | 11/2002 | Takizawa | |

* cited by examiner

*Primary Examiner*—Que T Le

(57) ABSTRACT

A heat dissipation method for a projector includes measuring a first temperature at an intake vent of a projector, measuring a second temperature at an outlet vent of the projector, controlling a heat sink of the projector based on the first temperature when the second temperature is smaller than a predetermined value, and controlling the heat sink of the projector based on the second temperature when the second temperature is larger than the predetermined value.

18 Claims, 9 Drawing Sheets

METHOD AND APPARATUS CAPABLE OF CONTROLLING HEAT DISSIPATION BASED ON TEMPERATURES MEASURED AT AN INTAKE VENT AND AN OUTLET VENT

BACKGROUND OF THE INVENTION

1. Field of the Invention

The present invention relates to a heat dissipation method and related apparatus, and more particularly, to a heat dissipation method and related apparatus capable of controlling heat dissipation based on temperatures measured at an intake vent and an outlet vent.

2. Description of the Prior Art

Projectors can display data such as images, texts or files on a screen and are thus widely used in events such as commercial exhibitions or educational trainings. In most projectors, images are generated by projecting light provided by a light source from the interior of the projectors. Since a light source creates heat during light emission, the internal temperatures at different location of a projector must be carefully controlled so that each device of the projector can function with its best efficiency and can have a longer lifetime. Normally, a fan is disposed near the light source for lowering the internal temperature of the projector. The rotational speed of the fan is controlled based on temperatures measured by a sensor. This control mechanism is well known to those skilled in the art and is referred to the V-T (Velocity-Temperature) operation.

Reference is made to FIG. 1 for a diagram illustrating a prior art method for controlling the V-T operation. In FIG. 1, the horizontal axis represents temperatures measured by the sensor, and the vertical axis represents the rotational speed of the fan. Generally speaking, the V-T operation is performed by controlling the rotational speed of the fan based on temperatures measured by the sensor. When the temperature measured by the sensor is not greater than a temperature Tmin, the rotational speed of the fan is set to a minimum value RPMmin. When the temperature measured by the sensor is between the temperature Tmin and a temperature Tmax, the rotational speed of the fan is proportional to the measured temperature. When the temperature measured by the sensor is greater than the temperature Tmax, the rotational speed of the fan is set to a maximum value RPMmax.

In a prior art projector, two sensors S1 and S2 are respectively disposed near an intake vent and an outlet vent of the projector. The recommended range of operational temperature for a projector is defined based on external temperature in the specification of the projector. Since the intake vent of the projector is near the external environment, a first temperature T1 measured by the sensor S1 can reflect temperature variations of the external environment. The prior art projector can thus control the V-T operation of the fan based on the first temperature T1. On the other hand, the function of the outlet vent is to provide a heat dissipation path for the projector. Therefore, a second temperature T2 measured by the sensor S2 can reflect temperature variations of the projector. When the projector remains idle for a certain period of time, its body temperature and the temperature of the external environment can be nearly identical. When the projector is under operation, the second temperature T2 will be larger than the first temperature T1.

Reference is made to FIG. 2 for a flowchart illustrating a prior art heat dissipation method for a projector. The flowchart in FIG. 2 includes the following steps:

Step 200: start.

Step 210: measure a first temperature T1 near the intake vent of the projector using a sensor S1.

Step 220: measure a second temperature T2 near the outlet vent of the projector using a sensor S2.

Step 230: control the V-T operation of the fan based on the first temperature T1.

Step 240: determine if the second temperature T2 is larger than a threshold temperature $T_{TH}$; if second temperature T2 is larger than the threshold temperature $T_{TH}$, execute step 250; if the second temperature T2 is not larger than the threshold temperature $T_{TH}$, execute step 230.

Step 250: shut down the projector.

In FIG. 2, the threshold temperature $T_{TH}$ represents the maximum temperature allowable for the body of the projector. When the body temperature of the projector exceeds the threshold temperature $T_{TH}$, the internal devices of the projector may fail to function normally, or suffer from permanent damages. The sensor S1 is used to measure the temperature variations of the external environment, and the sensor S2 can reflect whether the heat dissipation path of the projector is blocked. Under normal operations, the heat dissipation path of the projector is completely unobstructed. However, a user may dispose the projector near an impediment (such as a wall or another equipment) in a way that the heat dissipation path of the projector is blocked by the impediment. Based on the influence of the impediment on heat dissipation, the degree of the above-mentioned obstruction can be defined as full-blockage or partial-blockage. Full-blockage can take place when the user disposes the projector in close vicinity to the wall so that the heat dissipation path of the projector is completely blocked. Under these circumstances, the heat generated by the light source of the projector is almost entirely accumulated inside the projector, and the body temperature of the projector thus rises sharply. Once the second temperature T2 measured by the sensor S2 exceeds the threshold temperature $T_{TH}$, the prior art method executes step 250 for shutting down the projector. Partial-blockage can take place when the outlet vent of the projector is near another equipment and only part of the heat dissipation path of the projector is obstructed. Therefore, some heat generated by the light source of the projector can still be dissipated outside the projector, and the body temperature of the projector only rises gradually. Under these circumstances, the prior art method controls the V-T operation of the fan based on the first temperature T1. If the fan dissipates heat with a speed slower than that of heat accumulation due to partial-blockage, the body temperature of the projector will continue to increase gradually. Once the second temperature T2 measured by the sensor S2 exceeds the threshold temperature $T_{TH}$, the prior art method executes step 250 for shutting down the projector.

In the prior art method, the projector controls the V-T operation of the fan based on the first temperature T1 measured by the sensor S1 regardless of the temperature variations at the outlet vent. The ability of heat dissipation provided by the fan is entirely controlled based on the first temperature T1, and the second temperature T2 is only used for determining when to shut down the projector. Therefore, the prior art method cannot respond to body temperature variations due to heat accumulation. When the outlet vent of the projector is partially blocked, heat dissipation provided by the fan controlled by the first temperature T1 is not capable of responding to heat accumulation due to different degrees of partial-blockage. The prior art projector cannot dissipate the redundant heat in time. In addition, although the projector can still function when the second temperature T2 is smaller than the threshold temperature $T_{TH}$, the body temperature of the projector will continue to increase gradually as a result of heat accumulation caused by partial-blockage, The internal devices or plastic material can be placed in an environment having a temperature outside the best operating temperature range, which may cause damages and deformation to the internal devices and plastic material.

SUMMARY OF THE INVENTION

The present invention provides a heat dissipation method for a projector having an intake vent, an outlet vent and a heat sink, the heat dissipation method comprising measuring a first temperature at the intake vent and measuring a second temperature at the outlet vent, controlling the heat sink based on the first temperature when the second temperature is smaller than a first predetermined value, and controlling the heat sink based on the second temperature when the second temperature is larger than the first predetermined value.

The present invention also provides a projector capable of controlling heat dissipation based on measured temperatures comprising a housing including an intake vent and an outlet vent; a heat sink for lowering a temperature of the projector; a first sensor disposed at the intake vent for measuring a first temperature; a second sensor disposed at the outlet vent for measuring a second temperature; and a logic device for controlling the heat sink based on the first temperature when the second temperature is smaller than a first predetermined value, and for controlling the heat sink based on the second temperature when the second temperature is larger than the first predetermined value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
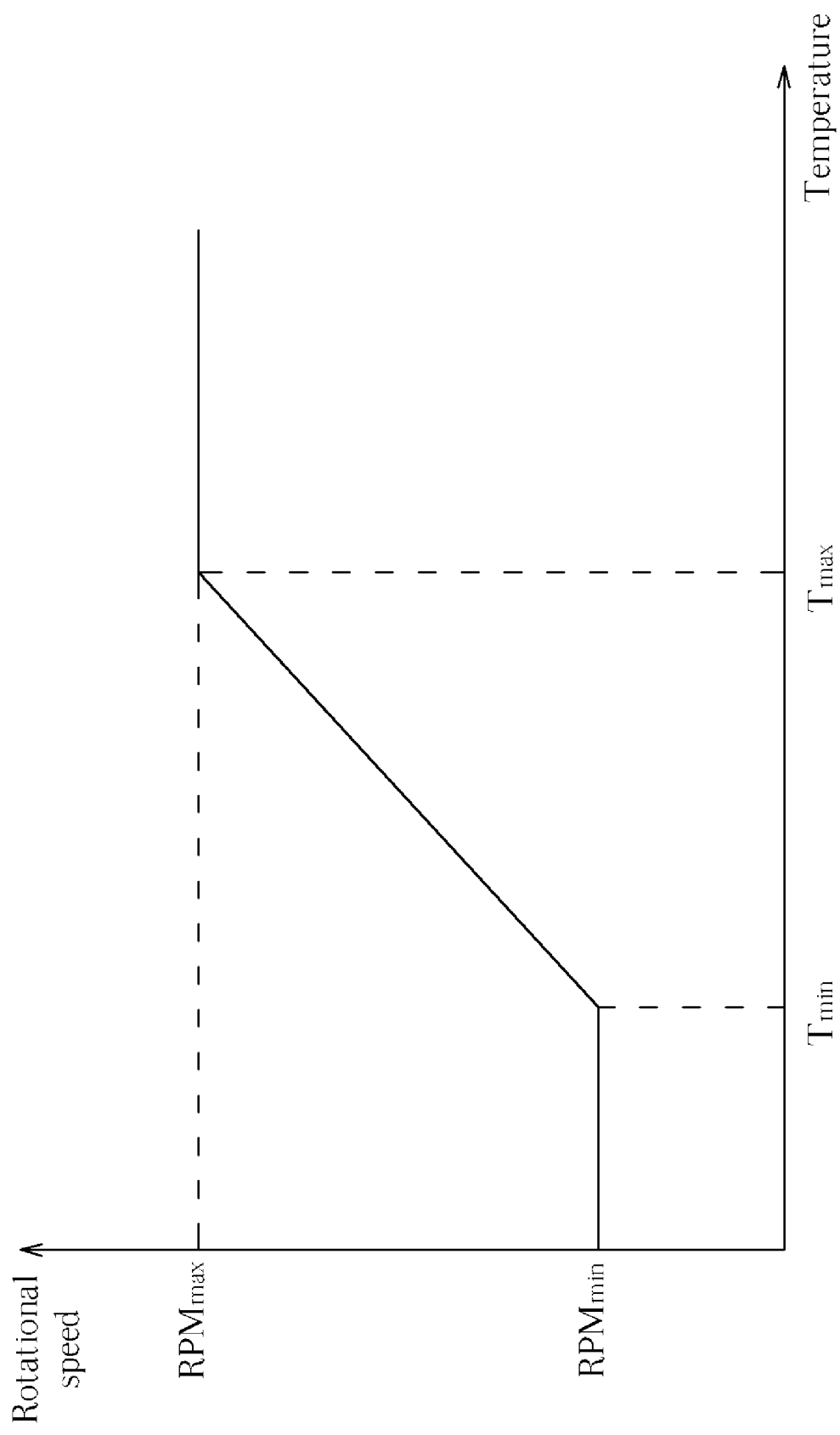
FIG. 1 is a diagram illustrating a prior art method for controlling the V-T operation.
Figure 2:
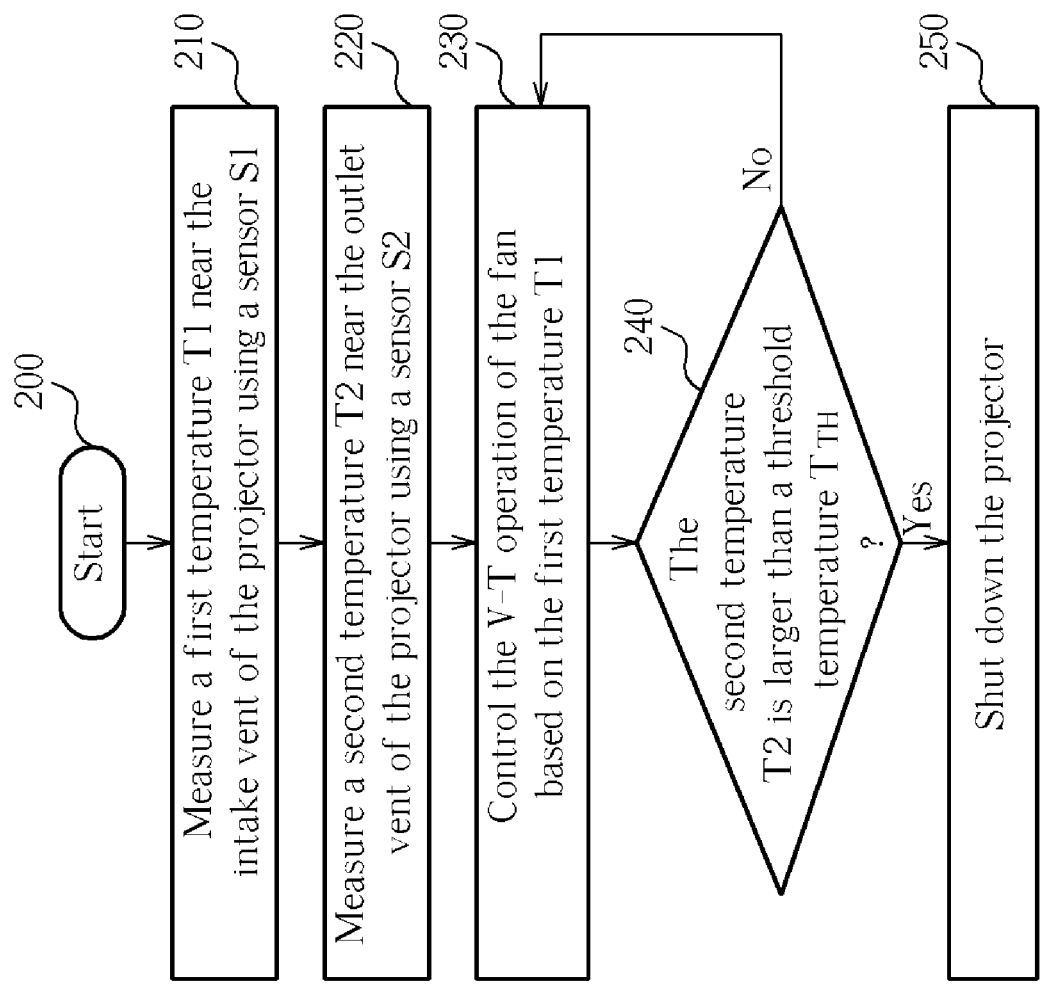
FIG. 2 is a flowchart illustrating a prior art heat dissipation method for a projector.
Figure 3:
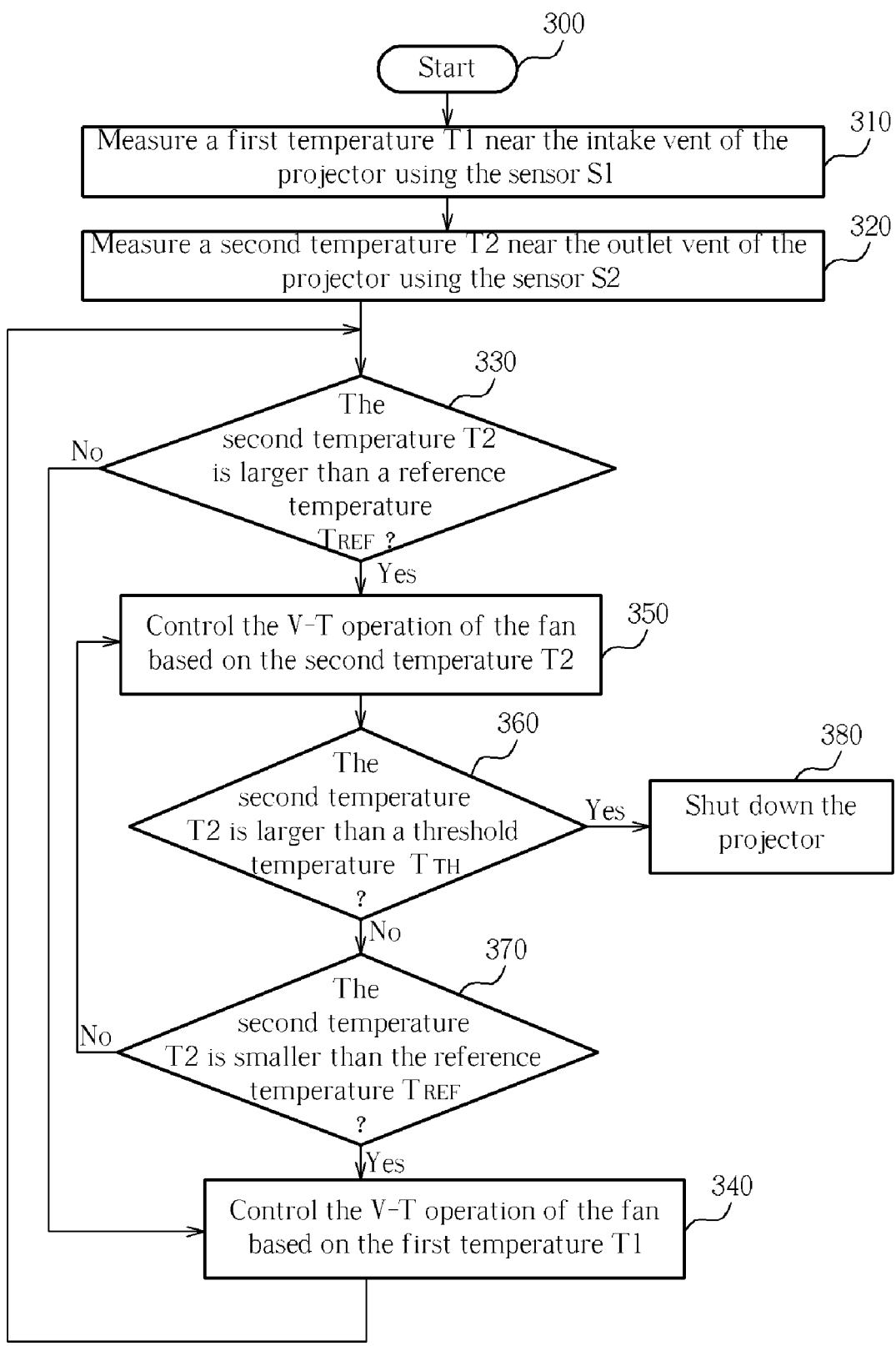
FIG. 3 is a flowchart illustrating a heat dissipation method for a projector according to a first embodiment of the present invention.

Reference is made to FIG. 3 for a flowchart illustrating a heat dissipation method for a projector according to a first embodiment of the present invention. The flowchart in FIG. 3 includes the following steps:

Step 300: start.

Step 310: measure a first temperature T1 near the intake vent of the projector using the sensor S1.

Step 320: measure a second temperature T2 near the outlet vent of the projector using the sensor S2.

Step 330: determine if the second temperature T2 is larger than a reference temperature $T_{REF}$; if the second temperature T2 is larger than the reference temperature $T_{REF}$, execute step 350; if the second temperature T2 is not larger than the reference temperature $T_{REF}$, execute step 340.

Step 340: control the V-T operation of the fan based on the first temperature T1; execute step 330.

Step 350: control the V-T operation of the fan based on the second temperature T2; execute step 360.

Step 360: determine if the second temperature T2 is larger than a threshold temperature $T_{TH}$; if the second temperature T2 is larger than the threshold temperature $T_{TH}$, execute step 380; if the second temperature T2 is not larger than the threshold temperature $T_{TH}$, execute step 370.

Step 370: determine if the second temperature T2 is smaller than the reference temperature $T_{REF}$; if the second temperature T2 is smaller than the reference temperature $T_{REF}$, execute step 340; if second temperature T2 is not smaller than the reference temperature $T_{REF}$, execute step 350.

Step 380: shut down the projector.

In FIG. 3, the threshold temperature $T_{TH}$ also represents the maximum temperature allowable for the body of the projector. When the second temperature T2 exceeds the threshold temperature $T_{TH}$, the internal devices of the projector may fail to function normally, or suffer from permanent damages. The reference temperature $T_{REF}$ is defined as the temperature measured at the outlet vent of the projector when partially blocked. The reference temperature $T_{REF}$, related to the degree of partial-blockage, the type of the fan, and the internal structure of the projector, the value of $T_{REF}$ can be obtained using simulations or experiments. For example, when controlling the V-T operation of the fan based on the first temperature T1 and blocking the outlet vent of the projector to a certain degree, the second temperature T2 measured at this moment can be defined as the reference temperature $T_{REF}$. When the second temperature T2 exceeds the reference temperature $T_{REF}$, the fan can no longer provide sufficient heat dissipation if the V-T operation of the fan continues to be controlled by the first temperature T1.

In the first embodiment of the present invention, the first temperature T1 corresponding to the temperature of external environment is measured using the sensor S1 in step 310, then the second temperature T2 corresponding to the degree of blockage in the heat dissipation path is measured using the sensor S2 in step 320. Next in step 330, it is determine whether the second temperature T2 is larger than the reference temperature $T_{REF}$: if the second temperature T2 is not larger than the reference temperature $T_{REF}$, it means that no blockage or slight partial-blockage is present at the outlet vent of the projector, and the heat dissipation path of the projector is unobstructed or only slightly obstructed. Therefore, step 340 is executed for controlling the V-T operation of the fan based on the first temperature T1; if the second temperature T2 is larger than the reference temperature $T_{REF}$, it means that the blockage present at the outlet vent of the projector is more serious, and the heat dissipation path of the projector is partially obstructed. If the projector continues to control the V-T operation of the fan based on the first temperature, the fan can no longer provide sufficient heat dissipation. Therefore, step 350 is executed for controlling the V-T operation of the fan based on the second temperature T2. The second temperature T2 is larger than the first temperature T1 and can reflect the heat accumulation caused by different degrees of blockage in the heat dissipation path. As a result, by controlling the V-T operation of the fan based on the second temperature T2 in step 350, the present invention can promptly increase the ability of heat dissipation provide by the fan in response to different degrees of blockage in the heat dissipation path. Note that, in steps 340 and 350, controlling the V-T operation of the fan based on the first and second temperatures T1 and T2 is controlling the fan based on the V-T operation corresponding to the first and second temperatures T1 and T2.

There are two ways for controlling the V-T operation of the fan based on the second temperature T2 in step 350. The first one is to adjust the rotational speed of the fan according to the value of the second temperature T2. The rotational speed of the fan increases with the value of the second temperature T2 SO that the heat created by the light source can be dissipated effectively. The second one is to set the rotational speed of the fan to its maximum rotational speed once the second temperature T2 exceeds the reference temperature $T_{REF}$, so that the heat created by the light source can be dissipated more effectively.

After controlling the V-T operation of the fan based on the second temperature T2 in step 350, it is determined in step 360 whether the second temperature T2 is larger than the threshold temperature $T_{TH}$. If the blockage at the outlet vent is so serious that the accumulated heat cannot be dissipated effectively even by controlling the V-T operation of the fan based on the second temperature T2, the body temperature of the projector will continues to rise. Once the second temperature T2 measured by the sensor S2 is larger than the threshold temperature $T_{TH}$, step 380 is executed for shutting down the projector and preventing from damaging the internal devices permanently. When the second temperature T2 measured by the sensor S2 is not larger than the threshold temperature $T_{TH}$, it means that the heat accumulated inside the projector due to blockage at the outlet vent cant be dissipated effectively by controlling the V-T operation of the fan based on the second temperature T2 in step 350. In this case, step 370 is executed for determining if the second temperature T2 can again be smaller than the reference temperature $T_{REF}$. If the second temperature T2 is again smaller than the reference temperature $T_{REF}$, it means that the body temperature of the projector has been lowered to the normal operational range, and step 340 will be executed for controlling the V-T operation of the fan based on the first temperature T1. If the second temperature T2 is not smaller than the reference temperature $T_{REF}$ again, the present invention continues to execute step 350 for controlling the V-T operation of the fan based on the second temperature T2.

Figure 4:
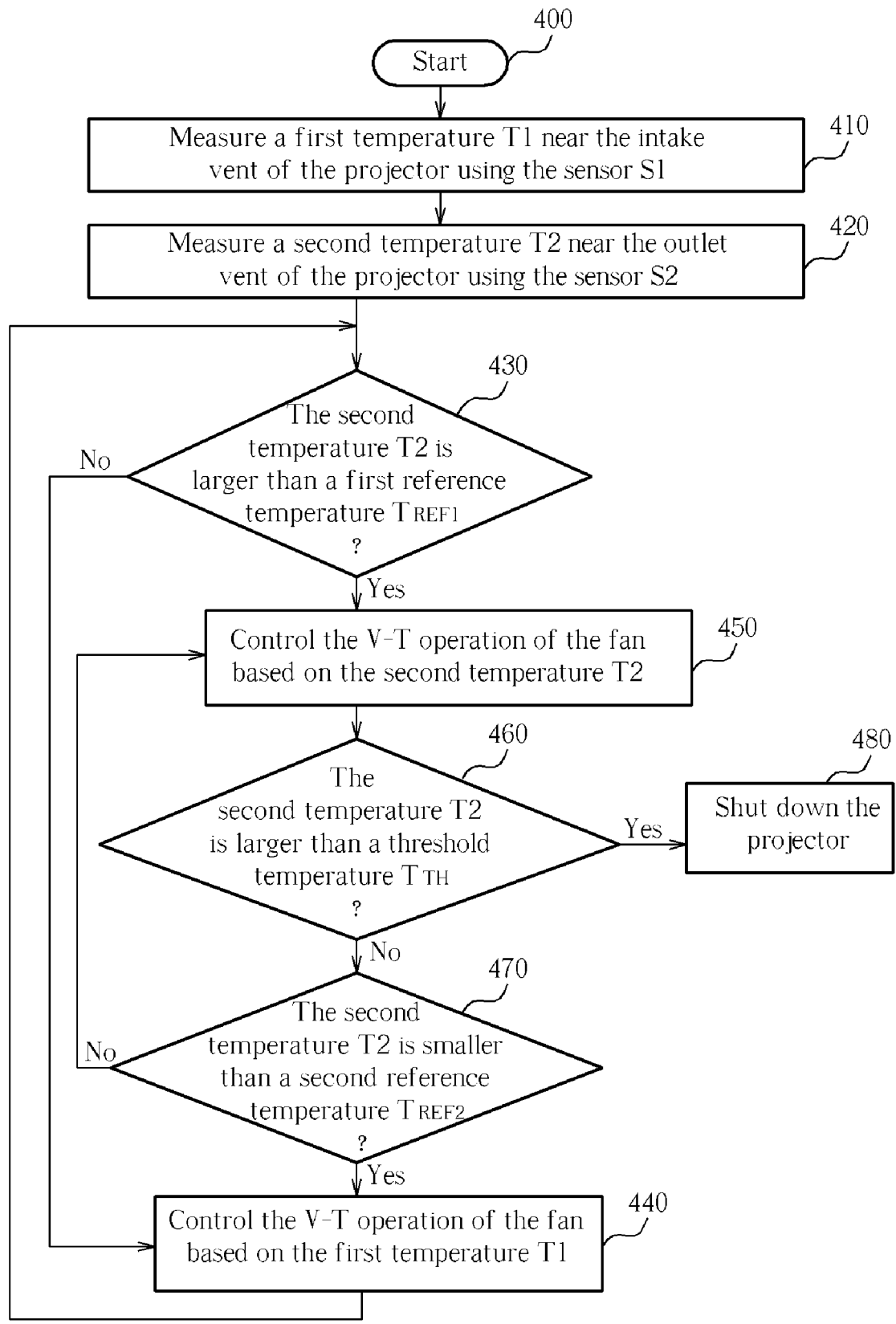
FIG. 4 is a flowchart illustrating a heat dissipation method for a projector according to a second embodiment of the present invention.

Reference is made to FIG. 4 for a flowchart illustrating a heat dissipation method for a projector according to a second embodiment of the present invention. The flowchart in FIG. 4 includes the following steps:

Step 400: start.

Step 410: measure a first temperature T1 near the intake vent of the projector using the sensor S1.

Step 420: measure a second temperature T2 near the outlet vent of the projector using the sensor S2.

Step 430: determine if the second temperature T2 is larger than a first reference temperature $T_{REF1}$; if the second temperature T2 is larger than the first reference temperature $T_{REF1}$, execute step 450; if the second temperature T2 is not larger than the first reference temperature $T_{REF}$i, execute step 440.

Step 440: control the V-T operation of the fan based on the first temperature T1; execute step 430.

Step 450: control the V-T operation of the fan based on the second temperature T2; execute step 460.

Step 460: determine if the second temperature T2 is larger than a threshold temperature $T_{TH}$; if the second temperature T2 is larger than the threshold temperature $T_{TH}$, execute step 480; if the second temperature T2 is not larger than the threshold temperature $T_{TH}$, execute step 470.

Step 470: determine if the second temperature T2 is smaller than a second reference temperature $T_{REF2}$; if the second temperature T2 is smaller than the second reference temperature $T_{REF2}$, execute step 440; if second temperature T2 is not smaller than the second reference temperature $T_{REF2}$, execute step 450.

Step 480: shut down the projector.

In FIG. 4, the threshold temperature $T_{TH}$ also represents the maximum temperature allowable for the body of the projector. When the second temperature T2 exceeds the threshold temperature $T_{TH}$, the internal devices of the projector may fail to function normally, or suffer from permanent damages. The first reference temperature $T_{REF1}$ is defined as the temperature measured at the outlet vent of the projector when partially blocked. The first reference temperature $T_{REF1}$, related to the degree of partial-blockage, the type of the fan, and the internal structure of the projector, can be obtained using simulations or experiments. For example, when controlling the V-T operation of the fan based on the first temperature T1 and blocking the outlet vent of the projector to a certain degree, the second temperature T2 measured at this moment can be defined as the first reference temperature $T_{REF1}$. When the second temperature T2 exceeds the first reference temperature $T_{REF1}$, the fan can no longer provide sufficient heat dissipation if the V-T operation of the fan continues to be controlled by the first temperature T1.

The second embodiment of the present invention differs from the first embodiment in that a second reference temperature $T_{REF2}$ smaller than the first reference temperature $T_{REF1}$ is also defined. In the first embodiment of the present invention, the V-T operation of the fan is controlled based on the second temperature T2 when the second temperature T2 becomes larger than the reference temperature $T_{REF}$, and based on the first temperature T1 when the second temperature T2 becomes lower than the reference temperature $T_{REF}$ again. In the second embodiment of the present invention, the V-T operation of the fan is controlled based on the second temperature T2 when the second temperature T2 becomes larger than the first reference temperature $T_{REF1}$, and based on the first temperature T1 only when the second temperature T2 becomes lower than the second reference temperature $T_{REF}$2. The difference between the first reference temperature $T_{REF1}$ and the second reference temperature $T_{REF2}$ insures that the V-T operation of the fan is again controlled based on the first temperature T1 only when the second temperature T2 becomes lower than the first reference temperature $T_{REF1}$ to a certain degree. Therefore, when the second temperature T2 somehow fluctuates around the first reference temperature $T_{REF1}$, the projector will not constantly switch between controlling the V-T operation of the fan based on the first temperature T1 and based on the second temperature T2. Note that, in steps 440 and 450, controlling the V-T operation of the fan based on the first and second temperatures T1 and T2 is controlling the fan based on the V-T operation corresponding to the first and second temperatures T1 and T2.

In the first and second embodiments of the present invention, after determining that the second temperature T2 is larger then the reference temperatures $T_{REF}$ and $T_{REF1}$ (in step 330 and step 430), the present invention can further output an alarm signal corresponding to overheat. The alarm signal can include an OSD (On Screen Display) signal, an audio signal, or other types of signals so that the user can be informed of possible presence of obstruction at the outlet vent of the projector. The alarm signal can be de-activated by pressing any button of the projector.

Figure 5:
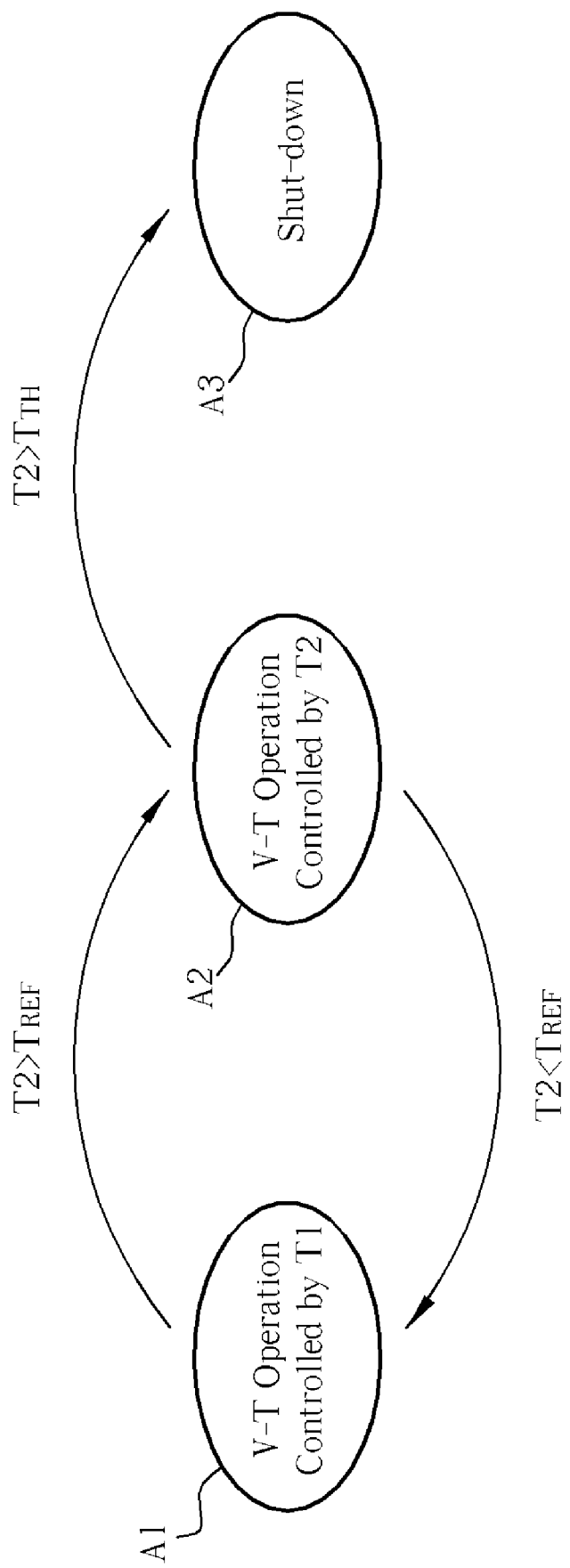
FIG. 5 is a state diagram illustrating the operation of the first embodiment.
Figure 6:
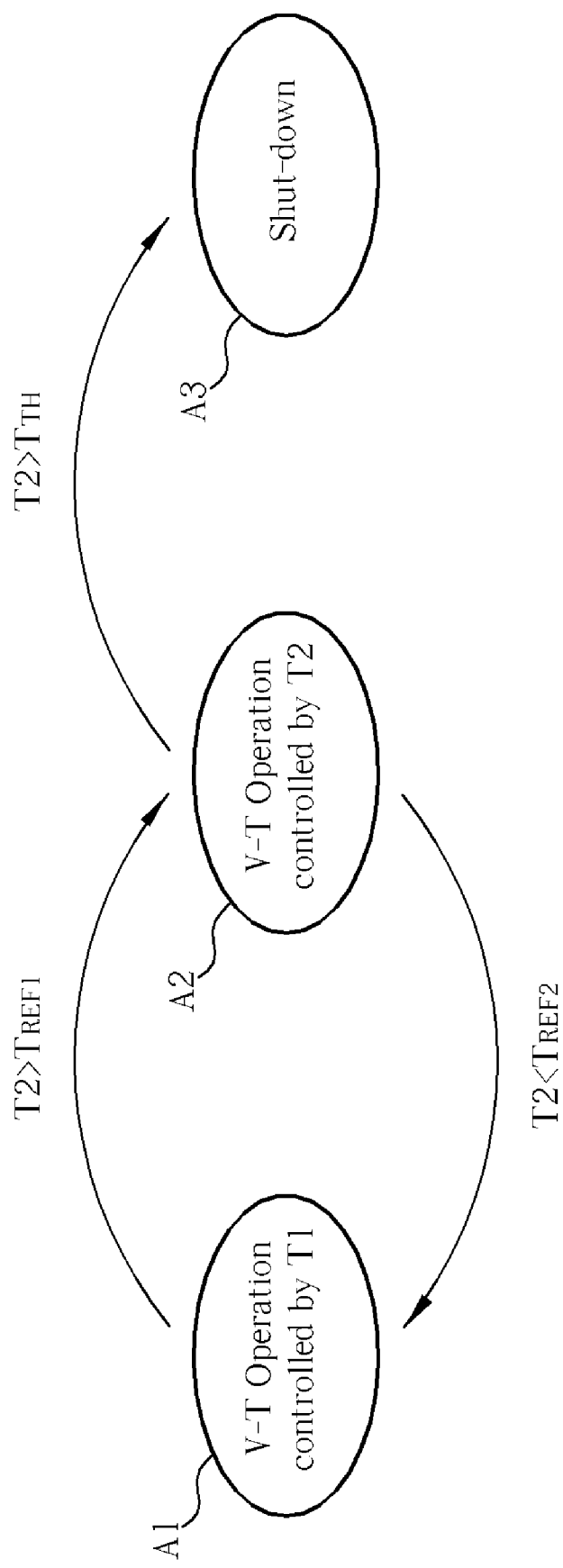
FIG. 6 is a state diagram illustrating the operation of the second embodiment.

Reference is made to FIGS. 5 and 6 for state diagrams illustrating the operations of the first and second embodiments, respectively. State A1 corresponds to the V-T operation of the fan based on the first temperature T1, State A2 corresponds to the V-T operation of the fan based on the second temperature T2, and State A3 corresponds to the state when the projector is shut down. In FIG. 5, the switching between State A1 and State A2 is determined based on the relationship between the second temperature T2 and the reference temperature $T_{REF}$, and the switching from State A2 to State A3 is determined based on the relationship between the second temperature T2 and the threshold temperature $T_{TH}$, wherein $T_{TH} > T_{REF}$. In FIG. 6, the switching from State A1 to State A2 is determined based on the relationship between the second temperature T2 and the first reference temperature $T_{REF1}$, the switching from State A2 to State A1 is determined based on the relationship between the second temperature T2 and the second reference temperature $T_{REF}2$, and the switching from State A2 to State A3 is determined based on the relationship between the second temperature T2 and the threshold temperature $T_{TH}$, wherein $T_{TH} > T_{REF1} > T_{REF2}$.

Figure 7:
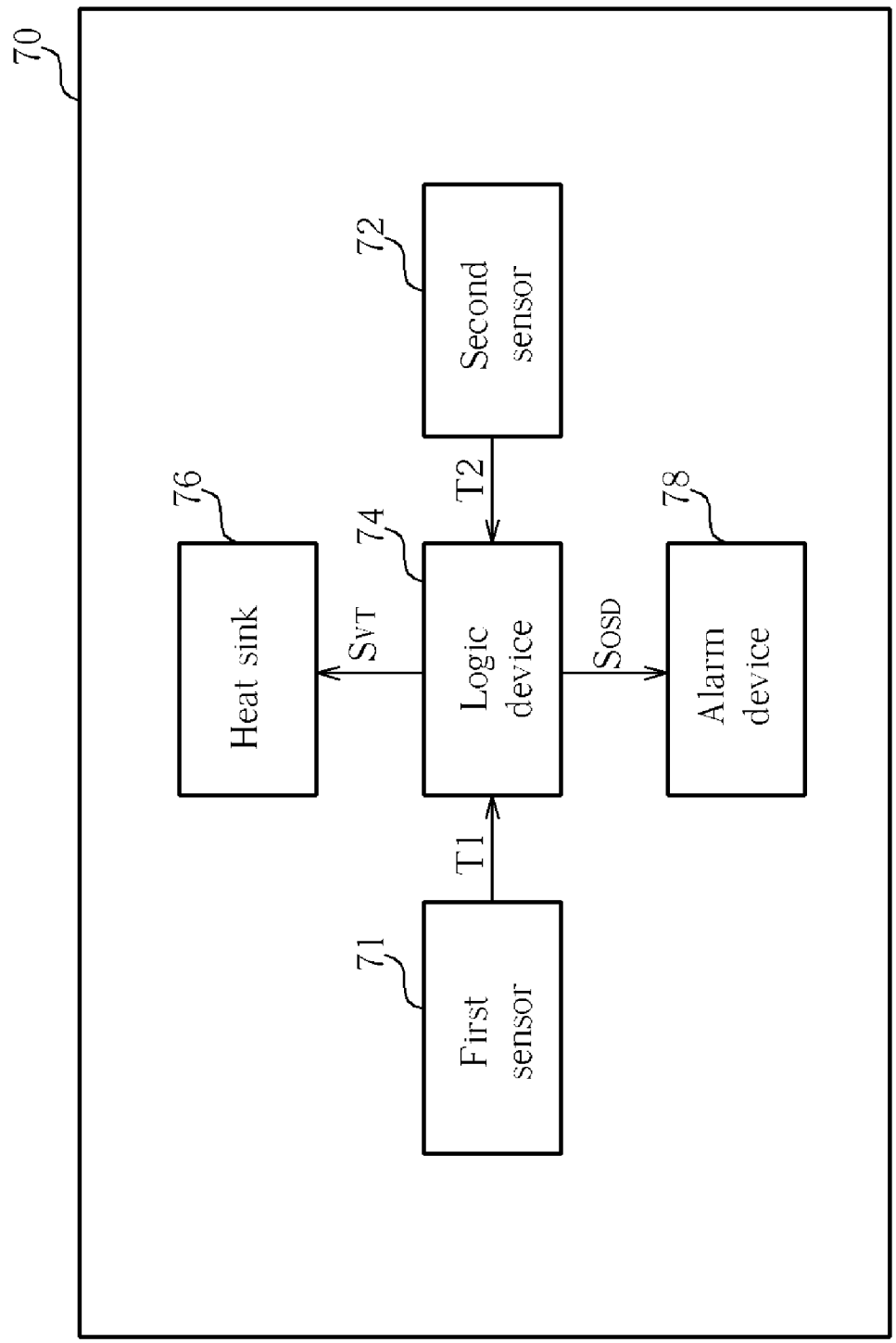
FIG. 7 is a functional diagram illustrating a projector according to the present invention.
Figure 8:
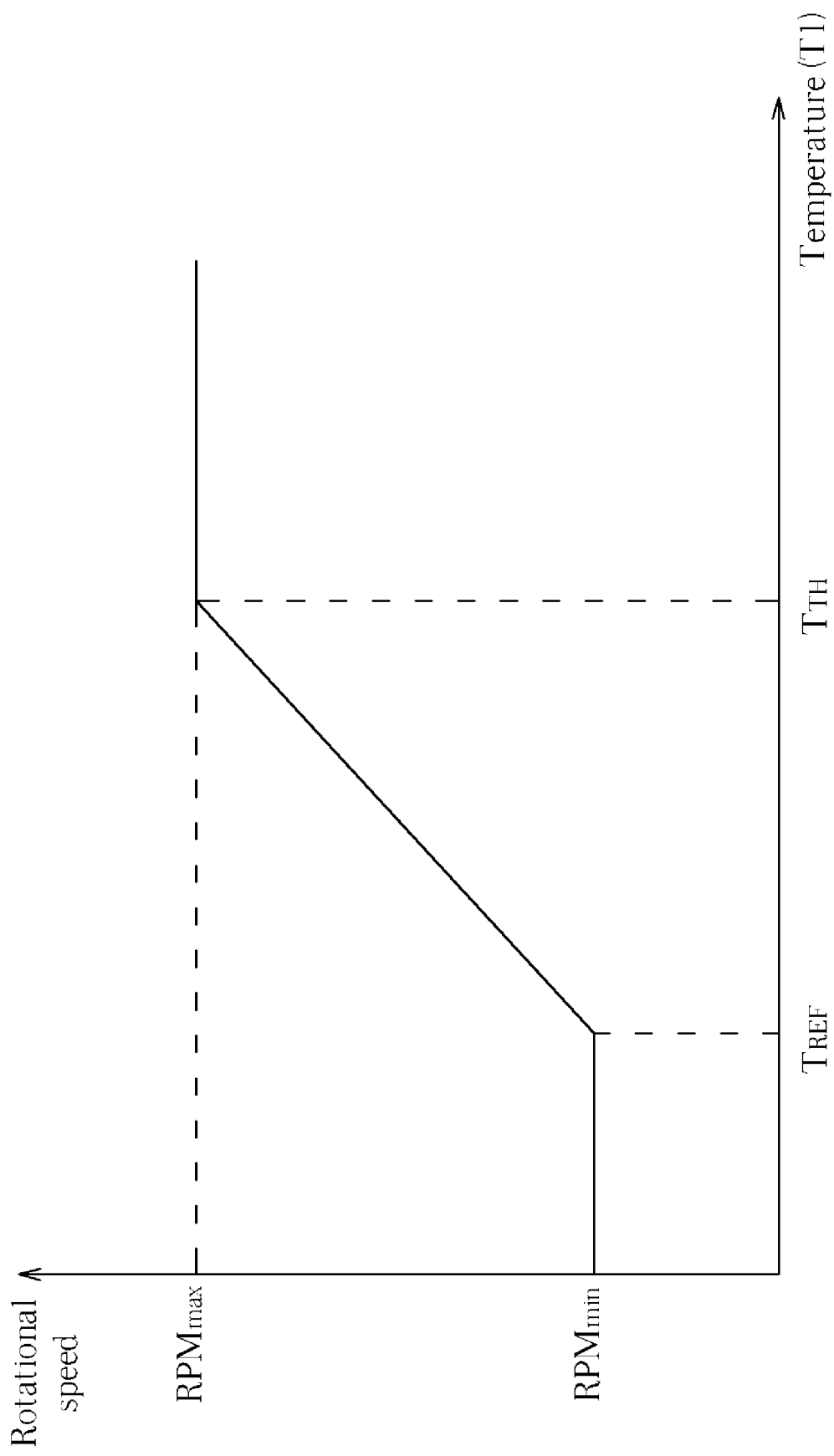
FIG. 8 is a diagram illustrating V-T operation according to the present invention.
Figure 9:
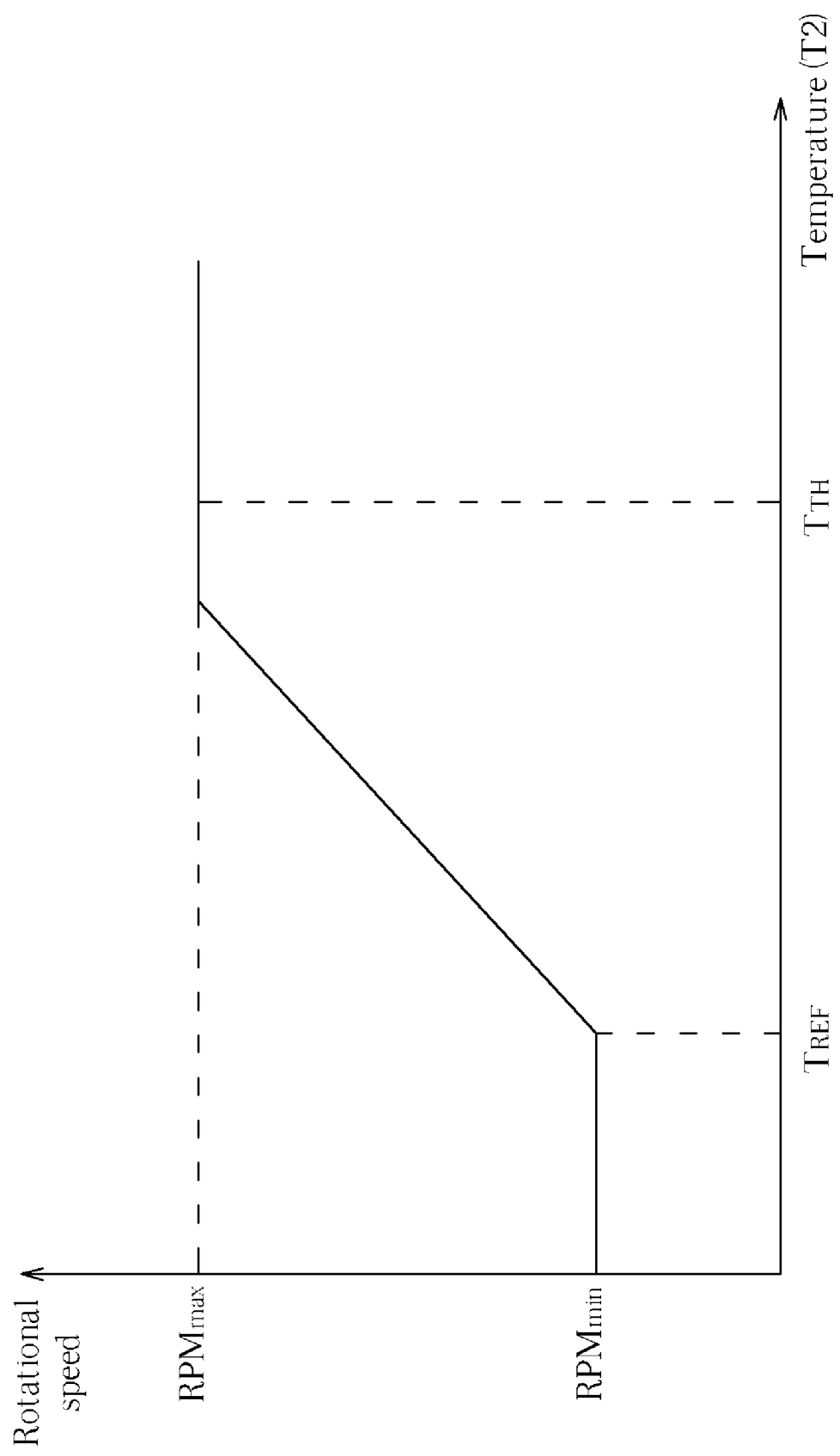
FIG. 9 is a diagram illustrating V-T operation according to the present invention.

In FIG. 8 and FIG. 9, controlling the V-T operation of the fan based on the first and second temperatures T1 and T2 is controlling the fan based on the V-T operation corresponding to the first and second temperatures T1 and T2. In addition, those skilled in the art can appropriately set $T_{TH}$ and $T_{REF}$ according to different requirements. Reference is made to FIG. 7 for a functional diagram illustrating a projector 70 according to the present invention. The projector 70 includes a first sensor 71, a second sensor 72, a logic device 74, a heat sink 76, and an alarm device 78. The first sensor 71 measures a first temperature T1 at the intake vent of the projector 70, while the second sensor 72 measures a second temperature T2 at the outlet vent of the projector 70. According to the steps illustrated in FIGS. 3 and 4, based on the first temperature T1 or the second temperature T2, the logic device 74 generates a control signal $S_{VT}$ to the heat sink 76 or an alarm signal $S_{OSD}$ corresponding to overheat to the alarm device 78. The heat sink 76 can include a fan whose rotational speed is controlled based on the control signal $S_{VT}$. When receiving the alarm signal $S_{OSD}$, the alarm device 78 can output signals, such as an OSD signal, an audio signal or other types of signals.

The present invention controls heat dissipation of a projector based on temperatures measured at the intake vent and the outlet vent of the projector at the same time. Within normal operating range of temperature, the V-T operation of the fan is controlled based on the temperature measured at the intake vent of the projector. Once the temperature measured at the outlet vent of the projector exceeds a predetermined value, the V-T operation of the fan is controlled based on the temperature measured at the outlet vent of the projector. The present invention can provide better heat dissipation control by promptly dissipating heat in response to different degrees of blockage at the outlet vent of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A heat dissipation method for a projector having an intake vent, an outlet vent and a heat sink comprising the following steps:
   (a) measuring a first temperature at the intake vent and measuring a second temperature at the outlet vent;
   (b) controlling the heat sink based on the first temperature when the second temperature is smaller than a first predetermined value; and
   (c) controlling the heat sink based on the second temperature when the second temperature is larger than the first predetermined value.

2. The method of claim 1 wherein step (c) further comprises:
   shutting down the projector when the second temperature is larger than a second predetermined value, wherein the second predetermined value is larger than the first predetermined value.

3. The method of claim 1 wherein step (c) further comprises:
   outputting an alarm signal corresponding to overheat when the second temperature is larger than the first predetermined value.

4. The method of claim 3 wherein the alarm signal comprises an OSD (On Screen Display) signal that can be de-activated by pressing a control button of the projector.

5. The method of claim 3 wherein the alarm signal comprises an audio signal that can be de-activated by pressing a control button of the projector.

6. The method of claim 1 wherein step (c) further comprises:
   controlling the heat sink based on the first temperature when the second temperature is smaller than a third predetermined value, wherein the third predetermined value is smaller than the first predetermined value.

7. The method of claim 1 wherein step (c) further comprises:
   controlling the heat sink based on the first temperature when the second temperature is smaller than the first predetermined value.

8. The method of claim 1 wherein the heat sink comprises a fan, step (b) comprises controlling a first V-T (Velocity-Temperature) operation of the fan based on the first temperature, and step (c) comprises controlling a second V-T operation of the fan based on the second temperature.

9. The method of claim 8 wherein step (c) comprises controlling the second V-T operation of the fan by maintaining the fan at a maximum rotational speed.

10. A projector capable of controlling heat dissipation based on measured temperatures comprising:
    a housing including an intake vent and an outlet vent;
    a heat sink for lowering a temperature of the projector;
    a first sensor disposed at the intake vent for measuring a first temperature;
    a second sensor disposed at the outlet vent for measuring a second temperature; and
    a logic device for controlling the heat sink based on the first temperature when the second temperature is smaller than a first predetermined value, and for controlling the heat sink based on the second temperature when the second temperature is larger than the first predetermined value.

11. The projector of claim 10 wherein the projector is shut down when controlling the heat sink based on the second temperature and when the second temperature is larger than a second predetermined value that is larger than the first predetermined value.

12. The projector of claim 10 further comprising an alarm device for outputting an alarm signal corresponding to overheat when the second temperature is larger than the first predetermined value.

13. The projector of claim 12 wherein the alarm device is for outputting an OSD alarm signal that can be de-activated by pressing a control button of the projector.

14. The projector of claim 12 wherein the alarm device is for outputting an audio alarm signal that can be de-activated by pressing a control button of the projector.

15. The projector of claim 10 wherein when controlling the heat sink based on the second temperature and when the second temperature is smaller than a third predetermined value that is smaller than the first predetermined value, the projector controls the heat sink based on the first temperature.

16. The projector of claim 10 wherein when controlling the heat sink based on the second temperature and when the second temperature is smaller than the first predetermined value, the projector controls the heat sink based on the first temperature.

17. The projector of claim 10 wherein the heat sink comprises a fan and the logic device controls a V-T operation of the fan based on the first and second temperatures.

18. The projector of claim 17 wherein when controlling the fan based on the second temperature and when the second temperature is larger than a second predetermined value that is larger the first predetermined value, the logic device controls the V-T operation of the fan by maintaining the fan at a maximum rotational speed.

* * * * *

UNITED STATES PATENT AND TRADEMARK OFFICE
CERTIFICATE OF CORRECTION

PATENT NO. : 7,728,282 B2 Page 1 of 1
APPLICATION NO. : 11/750333
DATED : June 1, 2010
INVENTOR(S) : Fu-Shiung Shih and Tzu-Huan Hsu It is certified that error appears in the above-identified patent and that said Letters Patent is hereby corrected as shown below:

Title page, item [73] Assignee should be: Qisda Corporation

Signed and Sealed this

Thirty-first Day of August, 2010

David J. Kappos
*Director of the United States Patent and Trademark Office*